Figure 1:
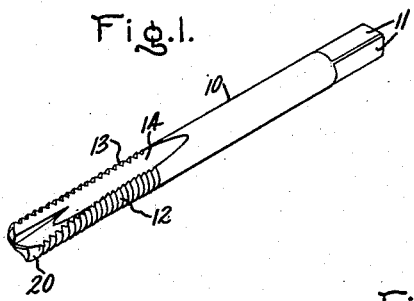

July 27, 1954    E. F. MINER ET AL    2,684,492
COMBINATION DRILLING AND TAPPING TOOL
Filed Oct. 25, 1949

Inventors:
Ernest Fordyce Miner,
Hiram Sylvester Davis,
by Ernest C. Britton
Their Attorney.

Patented July 27, 1954

2,684,492

UNITED STATES PATENT OFFICE 2,684,492

COMBINATION DRILLING AND TAPPING TOOL

Ernest Fordyce Miner, Pittsfield, and Hiram Sylvester Davis, Adams, Mass., assignors to General Electric Company, a corporation of New York Application October 25, 1949, Serial No. 123,462

1 Claim. (Cl. 10—140)

This invention relates to a combined drilling and tapping tool with which holes may be drilled and tapped in a single operation.

The combination of the drilling and tapping function in a single tool bit is generally well known in the metal-working arts. Commercially available tools of that type generally consist of the combination of a conventional drill and a conventional tap juxtaposed on a single shank. Being a somewhat specialized tool of limited application and being inherently more difficult to manufacture than either the conventional drill or conventional tap alone, the commercially available drilling and tapping tool is rather expensive. The susceptibility of small diameter drills and taps to breakage in operation coupled with the inherently high initial cost of the combined drilling and tapping tool has practically restricted the use of the combined tool to the production of tapped holes of relatively large diameter. Furthermore, since the drill portion of such tools extends from the tip thereof some distance back in an axial direction toward the shank and threaded portions, it is impossible to tap to the bottom of a hole being drilled and tapped. For example, in case a hole which is not to extend completely through a piece of material is drilled and tapped with the conventionally known combination tool, there will always be a drilled portion at the bottom of the hole equal to the axial length of the drilling portion of the tool which cannot be tapped with the same tool. Moreover, the presently known conventional tools cannot be reground.

Accordingly, it is an object of this invention to provide an improved combination drilling and tapping tool.

It is also an object of this invention to provide a combined drilling and tapping tool which may be inexpensively produced from a conventional tap.

It is a further object of this invention to provide a combination drilling and tapping tool with which a hole may be tapped to the bottom thereof with the same tool.

In accordance with this invention a conventional tapping tool is modified at the tip end thereof in such a manner as to form a drill cutting edge defined by a first plane surface sloping longitudinally to the tip end of the tap and intersecting the cutting edges of the threaded portion and the cutting face of the flute adjacent thereto together with another plane sloping toward the tip at a greater angle with respect to the longitudinal axis of the tool and intersecting the fluted surface adjacent the trailing edges of the same segment of thread cutting teeth. The cutting edge is actually defined by the intersection of these two plane surfaces or by the intersection of a third plane surface with the second plane surface and interconnecting the first two plane surfaces.

Figure 2:
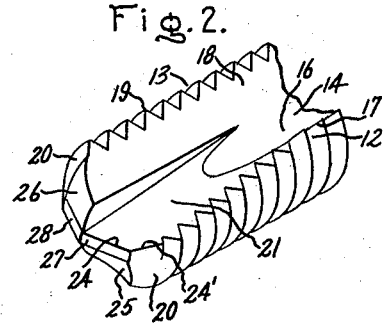
Figure 3:
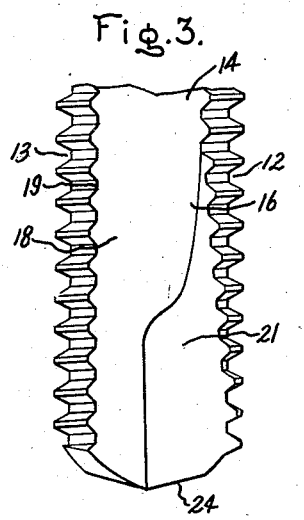
Figure 4:
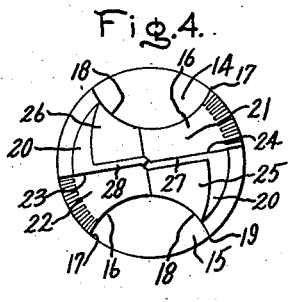
Figure 5:
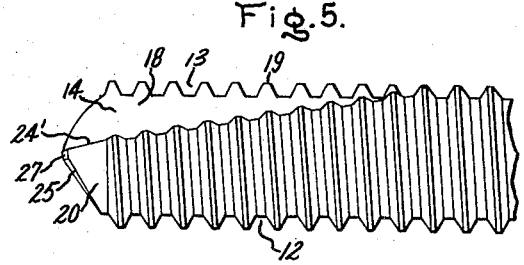

The invention will be better understood from the following description when taken in connection with the accompanying drawing and the scope of the invention will be pointed out in the appended claim. In the drawing, Fig. 1 is a perspective view of an entire tool comprising a combined drill and tap; Fig. 2 is a perspective view of the drilling end of the tool; Fig. 3 is an elevation view of the drilling or tip end of the tool; Fig. 4 is an end view of the drilling end of the tool, and Fig. 5 is a side view of the tip end of the tool when viewed from the right-hand side of Fig. 3.

Referring now to the details illustrated by the various figures, the tool comprises a cylindrical metal shank 10 having flat surfaces 11 at one end thereof to adapt the tool for engagement by a chuck or wrench. Extending approximately half the tool length from the opposite end of the tool, there are helically threaded peripheral portions or arcuate segments 12 and 13 defined by longitudinally extending flutes 14 and 15 which may run spirally or parallel as shown with respect to the longitudinal axis of the tool. With respect to each thread cutting segment, each flute defines a thread cutting face 16 together with a thread cutting edge 17 and a trailing face 18 together with a trailing edge or heel 19. To relieve the saw tooth cutting edges, the radius of the arcuate segments 12 and 13 may be decreased from the cutting edges 17 to the trailing edges 19 in the usual manner for taps. At the tip end of the tool, the segments may be provided with a chamfered surface 20. As thus far described, the tool is the ordinary and well familiar tap which, as a matter of fact, is the starting point for the practice of our invention.

To adapt the thread cutting tap for drilling purposes as well, a drill tip is provided by first forming a plane surface 21 sloping longitudinally to the tip end of the tool so as to intersect the cutting edge 17 of arcuate segment 12 and the cutting face 16. The slope or inclination of this plane surface in a longitudinal direction is most clearly illustrated by Fig. 5 of the drawing. Then a similar plane surface 22 sloping to the tip end of the tool at an inclination with respect to the longitudinal axis thereof opposite to the inclination of plane surface 21 is formed so as to intersect the cutting edge 17 of arcuate segment 13 and cutting face 16 thereof as shown. The terminating edge of plane surface 22 at the tip of the tool defines a drill cutting edge 23 extending from a point short of the longitudinal axis of the drill, inasmuch as plane surface 22 intersects only a portion of cutting face 16 of segment 13, transversely to the periphery of this segment or to the cutting edge 17 thereof. On the other hand, plane surface 21 intersects cutting face 16 of segment 12 in such a manner that it should be noted the terminating edge of this plane at the tip of the tool defines a drill cutting edge 24 which intersects and extends from the longitudinal axis of the tool transversely to the periphery of segment 12 or to the thread cutting edge 17. As a result thereof, it will be obvious that the conventional dead center usually found in drills has been eliminated so that in operation material will be cut or removed across the entire diameter of the hole being drilled and tapped. Although drill cutting edges 23 and 24 in the particular drill illustrated have been shown as extending backwardly toward the shank of the drill, it will be apparent to those skilled in the art that these edges may extend radially so that in addition to lying in a common plane passing through an axis of the tool they may also be aligned. Identifying numeral 24' represents the portion of cutting edge 24 formed by the intersection of plane surface 21 with chamfered surface 20. Obviously, plane surface 22 also intersects chamfered surface 20. To relieve cutting edges 23 and 24, plane surfaces 25 and 26, sloping longitudinally and transversely as well, toward the shank of the tool are formed so as to intersect respectively the trailing faces 18 of each flute or arcuate segment. The longitudinal angle of slope or inclination of plane surfaces 25 and 26 with respect to the longitudinal axis of the tool, it will be noted, is much greater than the corresponding angle between plane surfaces 21 and 22 and the axis of the tool. Fig. 5 of the drawing also better illustrates this inclination and the inclination in a transverse direction as well. To strengthen the cutting edges, third plane surfaces 27, interconnecting or intersecting surfaces 21 and 25, and 28, interconnecting or intersecting surfaces 22 and 26, are formed so as to slope backwardly from the tip toward the shank of the tool as illustrated for the purpose of relief. The provision of additional surfaces 27 and 28 incidentally facilitates resharpening of the tool since they reduce to a minimum the amount of resurfacing required to restore cutting edges 23 and 24.

While we have, in accordance with the patent statutes, shown a particular embodiment of our invention, other changes or modifications will be obvious to those skilled in the art and we, therefore, aim in the appended claim to cover all such changes or modifications as fall within the true spirit and scope of our invention.

What we claim as new and desire to secure by Letters Patent of the United States is:

A combination drilling and tapping tool comprising a cylindrical member having two concave flutes extending from one end of said member towards another end of said member and disposed diametrically opposite to each other, diametrically opposite portions of said member between said flutes having arcuate thread cutting segments thereon from said one end towards said another end intersected by said flutes, two plane surfaces disposed between the axis of said member and one of said portions extending towards each other at said one end and intersecting said one portion, both of said two plane surfaces inclined with respect to said axis from said one end towards said other end, one of said two plane surfaces inclined with respect to said axis at a greater angle than the other of said two plane surfaces and intersecting one of said flutes, said other plane surface intersecting the other of said flutes, said two plane surfaces disposed between the axis of said member and the other of said portions extending towards each other at said one end and intersecting said other portion, both of said another two plane surfaces inclined with respect to said axis from said one end towards said other end, one of said another two plane surfaces inclined with respect to said axis similar to said one plane surface and positioned diametrically opposite thereto and intersecting said other flute, the other of said another two plane surfaces inclined with respect to said axis similar to said other plane surface and positioned diametrically opposite thereto and intersecting said one flute, and two diametrically opposed third plane surfaces, one of said third plane surfaces intersecting said first mentioned other plane surface at said one end and defining therewith a drill cutting edge at said one end intersecting said axis, said one third plane surface inclined with respect to said axis from said one end towards said another end and intersecting said first mentioned one plane surface, the other of said third plane surfaces intersecting said other of said another two plane surfaces at said one end and defining therewith another drill cutting edge at said one end, said other third plane surface inclined with respect to said axis from said one end towards said another end similar to said one third plane surface and intersecting said one of said another two plane surfaces, both of said drill cutting edges disposed in a plane including said axis.

References Cited in the file of this patent

UNITED STATES PATENTS

| Number | Name | Date |
| --- | --- | --- |
| D. 30,485 | Prentiss | Apr. 4, 1899 |
| 93,224 | Humphreys | Aug. 17, 1869 |
| 1,020,860 | Vauclain | Mar. 19, 1912 |
| 1,294,263 | Holmes | Feb. 11, 1919 |
| 1,698,951 | Holmes | Jan. 15, 1929 |
| 1,746,046 | McIntosh | Feb. 4, 1930 |
| 1,845,063 | Trbojevich | Feb. 16, 1932 |
| 2,354,985 | Davis | Aug. 1, 1944 |
| 2,401,307 | Manewich | June 4, 1946 |
| 2,403,359 | Gerhold | July 2, 1946 |
| 2,479,730 | Dewar | Aug. 23, 1949 |
| 2,587,980 | Doepker | Mar. 4, 1952 |

FOREIGN PATENTS

| Number | Country | Date |
| --- | --- | --- |
| 19,493 | Great Britain | Sept. 13, 1893 |